United States Patent
Wagener

(10) Patent No.: US 9,755,738 B2
(45) Date of Patent: *Sep. 5, 2017

(54) CROSSTALK SUPPRESSION IN A MULTI-PHOTODETECTOR OPTICAL CHANNEL MONITOR

(71) Applicant: Nistica, Inc., Bridgewater, NJ (US)

(72) Inventor: Jefferson L. Wagener, Morristown, NJ (US)

(73) Assignee: Nistica, Inc., Bridgewater, NJ (US)

( * ) Notice: Subject to any disclaimer, the term of this patent is extended or adjusted under 35 U.S.C. 154(b) by 31 days.

This patent is subject to a terminal disclaimer.

(21) Appl. No.: 14/540,608

(22) Filed: Nov. 13, 2014

(65) Prior Publication Data

US 2016/0164600 A1    Jun. 9, 2016

Related U.S. Application Data

(63) Continuation-in-part of application No. 14/220,583, filed on Mar. 20, 2014.
(Continued)

(51) Int. Cl.
H04B 10/079 (2013.01)
G02B 6/35 (2006.01)
(Continued)

(52) U.S. Cl.
CPC ....... H04B 10/07955 (2013.01); G02B 6/293 (2013.01); G02B 6/35 (2013.01); H04J 14/0212 (2013.01)

(58) Field of Classification Search
CPC .................................. H04B 10/07–10/0779
(Continued)

(56) References Cited

U.S. PATENT DOCUMENTS 3,660,608 A    5/1972  Moose
5,617,234 A *  4/1997  Koga ................ G02B 6/12011
                                            385/37
(Continued)

FOREIGN PATENT DOCUMENTS

CN    102798849    * 11/2012  .......... H04B 10/118
EP    1 821 437 A1    8/2007
(Continued)

*Primary Examiner* — Li Liu
(74) *Attorney, Agent, or Firm* — Stuart H. Mayer; Mayer & Williams PC

(57) ABSTRACT

An optical device includes an optical port array having first and second optical inputs for receiving optical beams and a first plurality of optical outputs associated with switching functionality and a second plurality of optical outputs associated with channel monitoring functionality. A dispersion element receives the optical beam from an input and spatially separates the beam into a plurality of wavelength components. The focusing element focuses the wavelength components. The optical path conversion system receives the plurality of wavelength components and selectively directs each one to a prescribed one of the optical ports. The photodetectors are each associated with one of the optical outputs in the second plurality of optical outputs and receive a wavelength component therefrom. The controller causes the optical path conversion system to simultaneously direct each of the wavelength components to a different one of the optical outputs of the second plurality of optical outputs.

13 Claims, 5 Drawing Sheets

Related U.S. Application Data

(60) Provisional application No. 61/803,524, filed on Mar. 20, 2013.

(51) Int. Cl.
*G02B 6/293* (2006.01)
*H04J 14/02* (2006.01)

(58) Field of Classification Search
USPC .................................................. 398/25–38
See application file for complete search history.

(56) References Cited

U.S. PATENT DOCUMENTS

| | | | | |
|---|---|---|---|---|
| 5,986,782 A * | 11/1999 | Alexander | ........... | H04B 10/077 |
| | | | | 398/26 |
| 6,344,910 B1 * | 2/2002 | Cao | ................. | H04B 10/07955 |
| | | | | 398/212 |
| 6,430,328 B1 | 8/2002 | Culver et al. | | |
| 6,507,685 B1 * | 1/2003 | Polynkin | ............... | G01J 3/2803 |
| | | | | 385/15 |
| 6,721,473 B1 | 4/2004 | Islam | | |
| 6,753,958 B2 * | 6/2004 | Berolo | ................. | G01J 3/0259 |
| | | | | 356/328 |
| 6,847,479 B1 | 1/2005 | Islam | | |
| 6,882,771 B1 | 4/2005 | Islam | | |
| 6,956,687 B2 | 10/2005 | Moon et al. | | |
| 7,035,505 B2 * | 4/2006 | Shen | ................. | H04B 10/0795 |
| | | | | 385/24 |
| 7,092,599 B2 | 8/2006 | Frisken | | |
| 7,116,862 B1 | 10/2006 | Islam | | |
| 7,123,833 B2 | 10/2006 | Szczepanek et al. | | |
| 7,126,740 B2 | 10/2006 | Szczepanek et al. | | |
| 7,130,505 B2 * | 10/2006 | Shen | ................. | G02B 6/12019 |
| | | | | 385/24 |
| 7,181,101 B2 * | 2/2007 | Joo | ....................... | G01J 1/4228 |
| | | | | 385/147 |
| 7,339,714 B1 | 3/2008 | Islam | | |
| 7,397,980 B2 | 7/2008 | Frisken | | |
| 7,440,648 B2 * | 10/2008 | Oikawa | .............. | H04Q 11/0005 |
| | | | | 385/16 |
| 7,852,475 B2 * | 12/2010 | Crafts | ....................... | G01J 3/18 |
| | | | | 356/328 |
| 8,131,123 B2 * | 3/2012 | Presley | .............. | G02B 6/29311 |
| | | | | 385/16 |
| 8,699,024 B2 * | 4/2014 | Colbourne | ......... | G02B 27/4244 |
| | | | | 356/300 |
| 9,236,943 B2 * | 1/2016 | Ma | ....................... | H04B 10/071 |
| 2003/0099475 A1 | 5/2003 | Nemoto | | |
| 2009/0028503 A1 * | 1/2009 | Garrett | ............... | G02B 6/29311 |
| | | | | 385/18 |
| 2009/0232446 A1 | 9/2009 | Nagy | | |
| 2009/0304328 A1 * | 12/2009 | Presley | .............. | G02B 6/29311 |
| | | | | 385/16 |
| 2010/0221004 A1 * | 9/2010 | Haslam | ............... | H04J 14/0201 |
| | | | | 398/49 |
| 2012/0128347 A1 | 5/2012 | Sakamoto | | |
| 2012/0170930 A1 | 7/2012 | Komiya | | |
| 2012/0173175 A1 * | 7/2012 | Devicharan | ........... | H04N 5/359 |
| | | | | 702/60 |
| 2013/0028556 A1 | 1/2013 | Cohen | | |
| 2014/0178078 A1 * | 6/2014 | Ma | ....................... | H04B 10/071 |
| | | | | 398/122 |

FOREIGN PATENT DOCUMENTS

| | | |
|---|---|---|
| JP | 2006-140598 A1 | 6/2006 |
| JP | 2012-147152 | 8/2012 |
| JP | 2012-147152 A1 | 8/2012 |

* cited by examiner

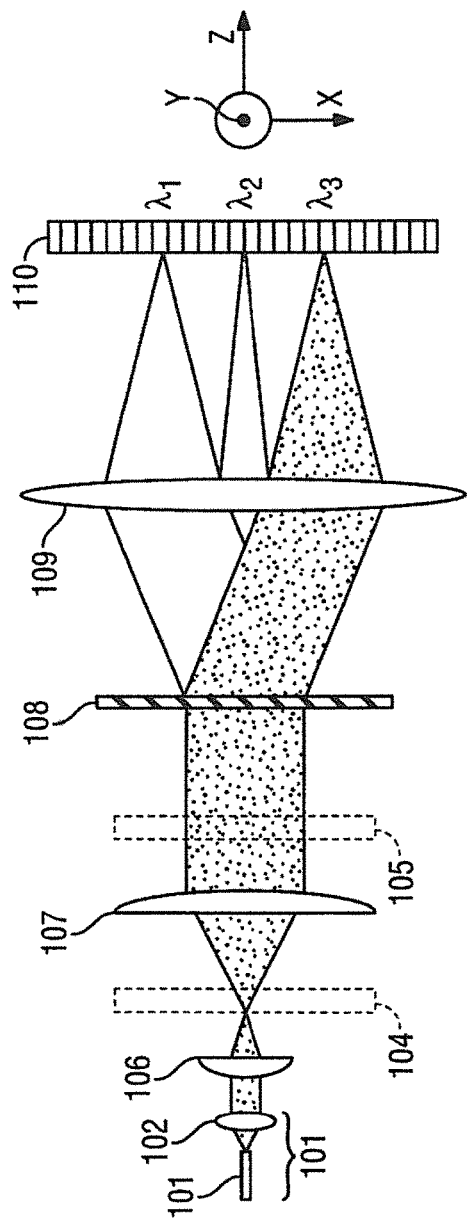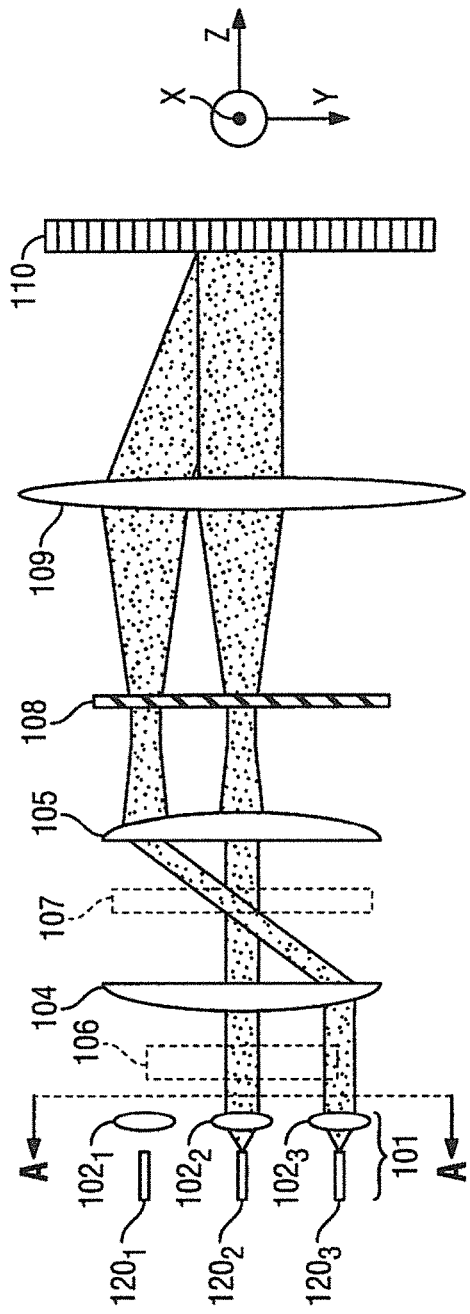

Example Measurement Sequence

| | Solid Channels Routed to | | | |
|---|---|---|---|---|
| | PD 1 | PD 2 | PD 3 | |
| Step 1 | | | | (No Channels Routed) |
| Step 2 | \| | \| | \| | |
| Step 3 | \| | \| | \| | |
| Step 4 | \| | \| | \| | |
| Step 5 | \| | \| | \| | |
| Step 6 | \| \| \| \| | | | (Block of Channels Routed to PD 1) |
| Step 7 | | \| \| \| \| | | |
| Step 8 | | | \| \| \| \| | |

FIG. 5

CROSSTALK SUPPRESSION IN A MULTI-PHOTODETECTOR OPTICAL CHANNEL MONITOR

BACKGROUND

Fiber optic communication systems typically employ wavelength division multiplexing (WDM), which is a technique for using an optical fiber to carry many spectrally separated independent optical channels. In a wavelength domain, the optical channels are centered on separate channel wavelengths which in dense WDM (WDM) systems are typically spaced apart by 25, 50, 100 or 200 GHz. Information content carried by an optical channel is spread over a finite wavelength band, which is typically narrower than the spacing between channels.

Optical channel monitoring is increasingly being used by telecommunications carriers and multi-service operators of fiber optic systems. As the traffic on optical networks increases, monitoring and management of the networks become increasingly important issues. To monitor the network, the spectral characteristics of the composite signal at particular points in the network must be determined and analyzed. This information may then be used to optimize the performance of the network. Optical channel monitoring is particularly important for modern optical networks that use reconfigurable and self-managed fiber-optic networks.

For example, reconfigurable optical add/drop multiplexers (ROADMs) and optical cross connects, which are used to manipulate individual wavelength channels as they are transmitted along the network, require an optical channel monitor. A ROADM allows dynamic and reconfigurable selection of wavelength channels that are to be added or dropped at intermediate nodes along the network. In a ROADM, for instance, an optical channel monitor can provide an inventory of incoming channels as well as an inventory of outgoing channels and to provide channel-power information to variable optical attenuator (VOA) control electronics so that the power of added channels can be equalized with the pass-through channels.

One type of optical channel monitor employs a wavelength selective switch (WSS), which is a type of switch configured to perform optical switching on a per wavelength channel basis, and is typically capable of switching any wavelength channel at an input fiber to any desired output fiber. Thus, a 1×N WSS can switch any wavelength channel of the WDM input signal propagating along the input fiber to any of the N output fibers coupled to the WSS.

U.S. Pat. Appl. Publ. No. 2010/0046944 shows an optical channel monitor that is incorporated in a WSS. This is accomplished by using the functionality of a 1×1 switch that is available in a 1×N WSS. In particular, the output of the 1×1 switch terminates with a photodiode. In this way, the power of any individual channel can be measured.

While the use of a 1×1 WSS to form an OCM is useful when the optical switching technology is sufficiently fast, this technique is not suitable when used with switches that do not have relatively fast response times. In particular, the optical switching time, the photodiode settling time and the number of channels being monitored determine the OCM loop speed, i.e., the time needed to monitor each channel one time. For many applications OCM loop speeds of less than 1 second, and ideally less than 0.1 second, are desired. Accordingly, the switch and photodiode settling times need to be sufficiently fast to interrogate many channels, which may approach or even exceed 100 in number. To accomplish a 0.2 second loop speed with a photodiode settling time of 1 ms and 100 channels, the optical switching time must also be 1 ms. While this is feasible with some technologies such as digital micro-mirror devices (DMDs) it is not practical with other technologies such as liquid crystal and Liquid Crystal on Silicon (LCoS) technologies.

SUMMARY

In accordance with one aspect of the invention, an optical device is provided. The optical device includes an optical port array, a dispersion element, a focusing element, an optical path conversion system, a plurality of photodetectors and a controller. The optical port array has at least first and second optical inputs for receiving optical beams and at least a first plurality of optical outputs associated with switching functionality and a second plurality of optical outputs associated with channel monitoring functionality. The dispersion element receives the optical beam from an optical input and spatially separates the optical beam into a plurality of wavelength components. The focusing element focuses the plurality of wavelength components. The optical path conversion system receives the plurality of wavelength components and selectively directs each of the wavelength components to a prescribed one of the optical ports. The plurality of photodetectors are each associated with one of the optical outputs in the second plurality of optical outputs and receive a wavelength component therefrom. The controller causes the optical path conversion system to simultaneously direct each of a plurality of wavelength components to a different one of the optical outputs of the second plurality of optical outputs.

In accordance with another aspect of the invention, a method is provided for monitoring the optical channels of a WDM optical signal. The method includes (a) simultaneously directing each channel in a first sequence of N channels of the WDM optical signal to a different one of N photodetectors, where N is greater than or equal to 2 and the WDM optical signal includes M channels, where M>N; (b) simultaneously measuring a power level of each of the N channels in the first sequence using the N photodetectors to obtain N measured power levels and (c) repeating steps (a) and (b) for one or more additional sequences of N channels of the WDM optical signal until the power level of each of the M channels has been measured by one of the photodetectors.

BRIEF DESCRIPTION OF THE DRAWINGS

FIGS. 3A and 3B are top and side views respectively of one example of a simplified optical device such as a free-space switch that may be used in conjunction with embodiments of the present invention.

FIG. 5 shows a sequence of 8 sets of simultaneous measurements which are obtained to account for crosstalk when a WDM signal having 12 channels are routed to an optical channel monitor that employs three photodetectors.

DETAILED DESCRIPTION

Figure 1:
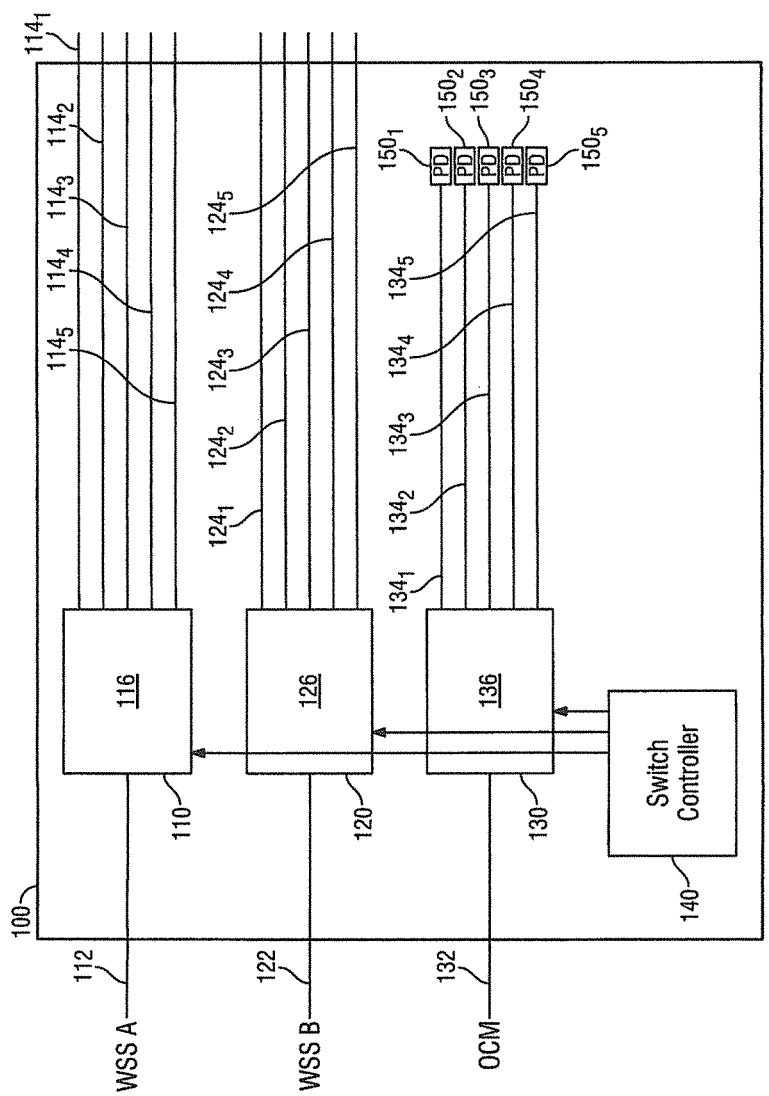
FIG. 1 shows a functional block diagram of one example of a wavelength selective switch (WSS) that includes an integrated channel monitor.

FIG. 1 shows a functional block diagram of one example of a wavelength selective switch (WSS) 100 that includes an integrated channel monitor. As shown, three distinct functions are depicted: two 1×n WSSs, represented by WSSs 110 and 120, and an optical channel monitor 130 (OCM). It should be noted, however, that as will be described below, the different functions may be incorporated into a single physical switching device.

WSS 110 includes an input port 112 and output ports $114_1$, $114_2$, $114_3$, $114_4$ and $114_5$ ("114"). A switching fabric 116 optically couples the input port 112 to the output ports 114 so that an optical signal received at the input port 112 can be selectively directed to one of the output ports 114 under the control of a switch controller 140. Similarly, WSS 120 includes an input port 122 and output ports $124_1$, $124_2$, $124_3$, $124_4$ and $124_5$ ("124"). A switching fabric 126 optically couples the input port 122 to the output ports 124 so that an optical signal received at the input port 122 can be selectively directed to one of the output ports 124 under the control of the switch controller 140.

OCM 130 is similar to WSSs 120 and 130 except that each of its output ports terminates in a photodetector such as a photodiode. In particular, OCM 130 includes an input port 132 and output ports $134_1$, $134_2$, $134_3$, $134_4$ and $134_5$ ("134"). A switching fabric 136 optically couples the input port 132 to the output ports 134 so that an optical signal received at the input port 132 can be selectively directed to one of the output ports 134 under the control of the switch controller 140. Photodiodes $150_1$, $150_2$, $150_3$, $150_4$ and $150_5$ receive light from optical outputs $134_1$, $134_2$, $134_3$, $134_4$ and $134_5$, respectively.

It should be noted that while the WSSs 110 and 120 and the OCM 130 are depicted as having five output ports, more generally any number of output ports may be employed, and this number may be the same or different among the three functional elements. That is, WSS 110, WSS 120 and OCM 130 may have the same or a different number of output ports.

Because the OCM has multiple output ports that are each equipped with a photodiode, multiple channels can be monitored simultaneously, thereby increasing the OCM loop speed. For instance, with only 1 photodiode, a 100-channel measurement would take 100 sequential samples with switch and settle times between each sample. If, for instance, a 1×20 WSS with 20 photodiodes were used, then each photodiode could be sampled nearly simultaneously, with 20 channels being detected in parallel. This would reduce the loop time by a factor of 20 from in comparison to time needed with a conventional arrangement. In this way a target loop time of 0.2 seconds with a settling time of 1 ms could support a switching time of 39 ms. Such a switching time is practical for use with liquid crystal-based switching technologies.

Figure 2:
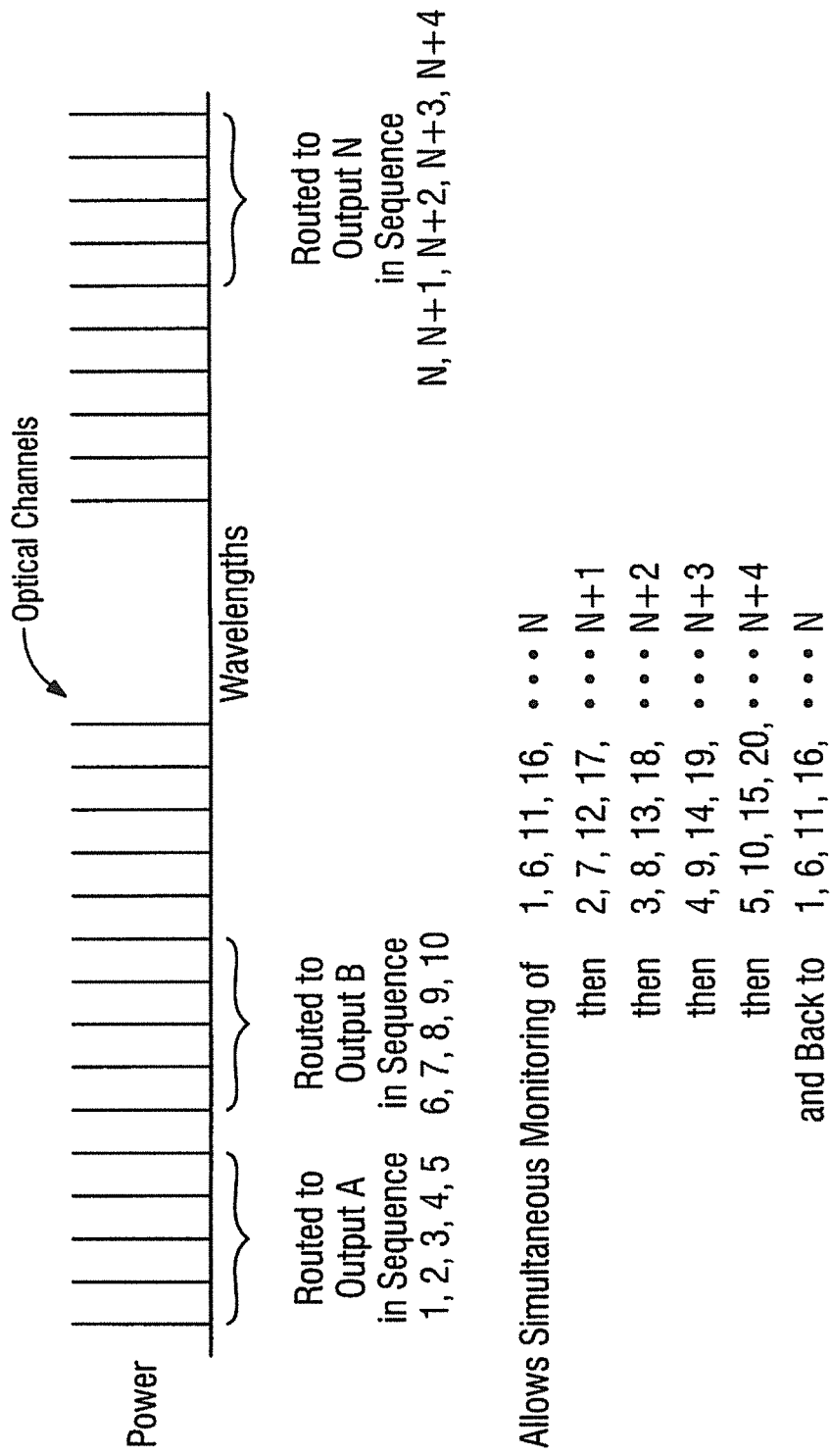
FIG. 2 illustrates one example of a sequence that may be used in connection with a device having a series of N (where N is equal to or greater than 2) WSSs each having 5 output ports and an OCM having N photodiodes receiving light from N output ports.

Individual channels may be simultaneously routed to the OCM 130 for monitoring in a wide variety of different ways. FIG. 2 illustrates one example of a sequence that may be used in connection with a device having a series of N (where N is equal to or greater than 2) WSSs each having 5 output ports and an OCM having N photodiodes receiving light from N output ports. As shown, channels wavelengths 1, 2, 3, 4 and 5 are routed in sequence to the five outputs of the first WSS. Wavelengths 6, 7, 8, 9 and 10 are routed in sequence to the five outputs of the second WSS. This process continues for each WSS, with the final wavelengths N, N+1, N+2, N+3, N+4 and N+5 being routed in sequence to the five outputs of the $N^{th}$ WSS.

Since the OCM has N outputs, one channel from each of the N WSSs can be monitored simultaneously. For instance, with such an arrangement channels or wavelengths 1, 6, 11, 16 . . . N can be simultaneously monitored. Then, after these channels have been monitored, channels 2, 7, 12, 17 . . . N+1 can be simultaneously monitored, followed by channels 3, 8, 13, 18 . . . N+2, and so on. Finally, the monitoring sequence may be completed by simultaneously monitoring channels 5, 10, 15, 20 . . . N+4, after which the entire sequence may be repeated. Accordingly, if there are a total of M channels in a WDM optical signal to be monitored, M/N different sets of N channels need to be measured to monitor each channel in the WDM optical signal one time.

For many applications it may be cost prohibitive to build a multi-port WSS that is solely dedicated for use as an OCM with multiple photodiodes. However, the cost diminishes substantially if the functionality of an OCM could be incorporated as an adjunct to a device that includes the functionality of one or more WSS if most of the optical elements used in the WSS(s) are also used to implement the functionality of the OCM. In this case, the incremental cost of the additional WSS can be small, making an OCM having multiple photodiodes a viable alternative.

Illustrative Wavelength Selective Switch

One example of a wavelength selective switch in which an optical channel monitor of the type described above may be incorporated will be described with reference to FIGS. 3-4. Additional details concerning this optical switch may be found in co-pending U.S. application Ser. No. 14/220,639 entitled "Wavelength Selective Switch Employing a LCoS Device and Having Reduced Crosstalk."

FIGS. 3A and 3B are top and side views respectively of one example of a simplified optical device such as a free-space WSS 100 that may be used in conjunction with embodiments of the present invention. Light is input and output to the WSS 100 through optical waveguides such as optical fibers which serve as input and output ports. As best seen in FIG. 3B, a fiber collimator array 101 may comprise a plurality of individual fibers $120_1$, $120_2$ and $120_3$ respectively coupled to collimators $102_1$, $102_2$ and $102_3$. Light from one or more of the fibers 120 is converted to a free-space beam by the collimators 102. The light exiting from port array 101 is parallel to the z-axis. While the port array 101 only shows three optical fiber/collimator pairs in FIG. 1B, more generally any suitable number of optical fiber/collimator pairs may be employed.

A pair of telescopes or optical beam expanders magnifies the free space light beams from the port array 101. A first telescope or beam expander is formed from optical elements 106 and 107 and a second telescope or beam expander is formed from optical elements 104 and 105.

In FIGS. 3A and 3B, optical elements which affect the light in two axes are illustrated with solid lines as bi-convex optics in both views. On the other hand, optical elements which only affect the light in one axis are illustrated with solid lines as plano-convex lenses in the axis that is affected. The optical elements which only affect light in one axis are also illustrated by dashed lines in the axis which they do not affect. For instance, in FIGS. 3A and 3B the optical elements 102, 108, 109 and 110 are depicted with solid lines in both figures. On the other hand, optical elements 106 and 107 are depicted with solid lines in FIG. 3A (since they have focusing power along the y-axis) and with dashed lines in FIG. 3B (since they leave the beams unaffected along the x-axis). Optical elements 104 and 105 are depicted with solid lines in FIG. 3B (since they have focusing power along the x-axis) and with dashed lines in FIG. 3A (since they leave the beams unaffected in the y-axis).

Each telescope may be created with different magnification factors for the x and y directions. For instance, the magnification of the telescope formed from optical elements 104 and 105, which magnifies the light in the x-direction, may be less than the magnification of the telescope formed from optical elements 106 and 107, which magnifies the light in the y-direction.

The pair of telescopes magnifies the light beams from the port array 101 and optically couples them to a wavelength dispersion element 108 (e.g., a diffraction grating or prism), which separates the free space light beams into their constituent wavelengths or channels. The wavelength dispersion element 108 acts to disperse light in different directions on an x-y plane according to its wavelength. The light from the dispersion element is directed to beam focusing optics 109.

Beam focusing optics 109 couple the wavelength components from the wavelength dispersion element 108 to a optical path conversion system. In this example the optical path conversion system is a programmable optical phase modulator, which may be, for example, a liquid crystal-based phase modulator such as a LCoS device 110. The wavelength components are dispersed along the x-axis, which is referred to as the wavelength dispersion direction or axis. Accordingly, each wavelength component of a given wavelength is focused on an array of pixels extending in the y-direction. By way of example, and not by way of limitation, three such wavelength components having center wavelengths denoted $\lambda_1$, $\lambda_2$ and $\lambda_3$ are shown in FIG. 3A being focused on the LCoS device 110 along the wavelength dispersion axis (x-axis).

As best seen in FIG. 3B, after reflection from the LCoS device 110, each wavelength component can be coupled back through the beam focusing optics 109, wavelength dispersion element 108 and optical elements 106 and 107 to a selected fiber in the port array 101. As discussed in more detail in the aforementioned co-pending U.S. application, appropriate manipulation of the pixels in the y-axis allows selective independent steering of each wavelength component to a selected output fiber.

In one particular embodiment, the LCoS 110 is tilted about the x-axis so that it is no longer in the x-y plane and thus is no longer orthogonal to the z-axis along which the light propagates from the port array 101. Stated differently, a skewed angle is formed between the z-axis and a direction in the plane of the modulator perpendicular to the wavelength dispersion axis. Such an embodiment is shown in FIG. 4, which is a side-view similar to the side-view shown in FIG. 3B. In FIG. 4 and FIGS. 3A and 3B, like elements are denoted by like reference numerals. By tilting the LOCS 110 in this manner crosstalk arises from scattered light can be reduced.

Figure 4:
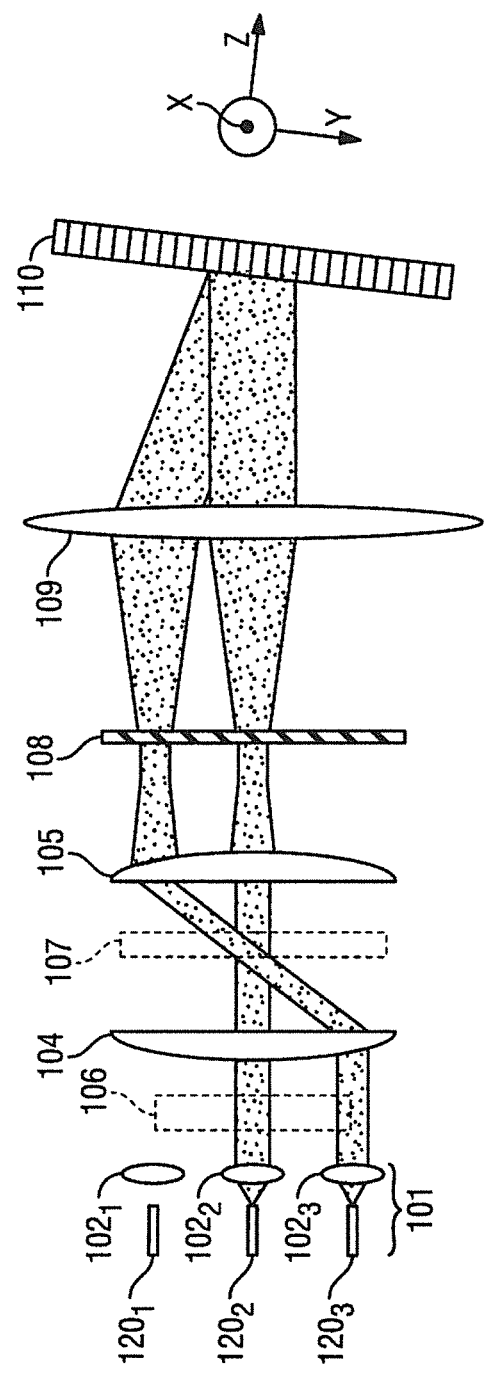
FIG. 4 is a side view of an alternative example of a simplified optical device such as a free-space switch that may be used in conjunction with embodiments of the present invention.

While the optical path conversion system employed in the particular wavelength selective switch shown in FIGS. 3-4 is based on a programmable optical phase modulator (e.g., a LCoS device), more generally other technologies may be employed instead, including, for instance, MEMs-based devices such as DMDs.

Crosstalk

One problem that arises when an OCM having multiple photodetectors is employed to simultaneously monitor multiple channels is that optical crosstalk between the photodiodes can cause inaccurate channel measurements. This may be a particularly serious problem when a LCoS device is employed as the switching technology.

To mitigate this undesired crosstalk, additional measurements can be made as part of the sequence of channel measurements described above. These additional measurements attempt to directly measure the crosstalk between the PDs and use this information to refine the estimate of the optical power on a channel. As explained below, these additional measurements, which are a direct measure of crosstalk between the photodiodes, scale as the number of PDs, not the number of channels. Hence, even with these additional measurements the technique still results in a reduction in the OCM loop time that the use of multiple PDs delivers.

The additional measurements that need to be taken to account for reducing crosstalk are described below.

One measurement determines the power received by each of the photodetectors when no channels are routed to any of the PDs. This requires one additional set of simultaneous measurements to be taken from the N PDs. Another measurement determines the power received by each of the photodetectors when a block of channels is sent to one and only one of the PDs without routing any channels to any of the other PDs. This latter measurement is repeated by sending, in turn, a block of channels to each individual PD without sending any channels to any other PD. These latter simultaneous measurements are thus performed N times. Thus, in total, an additional N+1 simultaneous sets of measurements need to be taken from the N PDs.

The series of measurements that need to be taken can be best illustrated by an example. Suppose an OCM has 3 photodetectors and an optical signal has 12 total channels to be measured. That is, for this example N=3 and M=12. Accordingly, M/N=4 sets of simultaneous measurements are needed to monitor the complete set of channels and N+1=4 additional sets of simultaneous measurements are needed to take crosstalk into account. Accordingly, in this example a total of 8 sets of simultaneous measurements need to be taken.

The sequence of the 8 sets of simultaneous measurements may be as follows:
1: No channels routed to any PDs.
2: Channel 1 routed to PD 1, Channel 5 routed to PD 2, Channel 9 routed to PD 3
3: Channel 2 routed to PD 1, Channel 6 routed to PD 2, Channel 10 routed to PD
4: Channel 3 routed to PD 1, Channel 7 routed to PD 2, Channel 11 routed to PD 3.
5: Channel 4 routed to PD 1, Channel 8 routed to PD 2, Channel 12 routed to PD 3.
6: Channels 1, 2, 3, 4 routed to PD 1, none routed to PD 2, none routed to PD 3
7: None routed to PD 1, channels 5, 6, 7, 8 routed to PD 2, none routed to PD 3
8: None routed to PD 1, none routed to PD 2, channels 9, 10, 11, 12 routed to PD 3

This sequence of 8 sets of simultaneous measurements are illustrated in FIG. 5, which shows the channels that are routed to the three PDs in each of the steps. A dashed vertical line indicates that the particular channel is not routed to the particular photodetector during that step. A solid vertical line indicates that the particular channel is routed to the particular photodetector during that step. For example, in step 1, no channels are routed to the three photodiodes when the first set of measurements is made. Similarly, in step 2, channels 1, 5 and 9 are respectively routed to Photodiodes 1, 2 and 3 when the second set of measurements is made.

These 8 sequential measurements result in a total of 24 individual readings (3 PDs for 8 steps). The readings can then be used as a set to determine an accurate channel power even when there is significant optical crosstalk.

In one illustrative embodiment, the readings can be used to develop a crosstalk matrix M having entries Ma,p that denote the crosstalk contribution from all the PDs during step number a when PD number p is being measured. This matrix is thus a (M/N+(N+1))×N dimensional matrix. For instance, if the power level of PD 1 is being measured, the contribution to this measurement from power routed to PD 2 is proportionally equal to X1,2=M7,1/M7,2. Similarly, the crosstalk contribution to the power level of PD1 from power routed to PD3 is proportionally equal to X1,3=M8,1/M8,3. The crosstalk contribution to the measurement when no channels are routed is proportionally equal to X1,0=M1,1/(M6,1+M7,2+M8,3). In general these ratios should not be allowed to exceed 1.

Using these ratios for PD1, and equivalent ones for the other PDs, a corrected channel power level can be iteratively found solving the following series of simultaneous equations:

$$M_k = A_K + \sum_{i=0, i \neq k}^{n} X_i A_i$$

Where $M_k$ is the measured or detected power of channel k and $A_k$ is actual power level of channel k after the impact of crosstalk is reduced or eliminated.

The invention claimed is:

1. An optical device, comprising:
an optical port array having at least first and second optical inputs for receiving optical beams and at least a first plurality of optical outputs associated with switching functionality and a second plurality of optical outputs associated with channel monitoring functionality;
a dispersion element receiving the optical beam from an optical input and spatially separating the optical beam into a plurality of wavelength components;
a focusing element for focusing the plurality of wavelength components;
an optical path conversion system for receiving the plurality of spatially separated wavelength components and selectively directing each of the spatially separated wavelength components back through the focusing element and the dispersion element to a prescribed one of the optical ports;
a plurality of photodetectors each associated with one of the optical outputs in the second plurality of optical outputs for receiving a wavelength component therefrom; and
a controller for causing the optical path conversion system to:
a. simultaneously direct each spatially separated wavelength component in a first sequence of N channels of the WDM optical signal to a different one of N photodetectors, where N is greater than or equal to 2 and the WDM optical signal includes M wavelength components, where M>N;
b. simultaneously measure a power level of each of the N wavelength components in the first sequence using the N photodetectors to obtain N measured power levels;
c. repeat steps (a) and (b) for one or more additional sequences of N wavelength components of the WDM optical signal until the power level of each of the M wavelength components has been measured by one of the photodetectors,
wherein the controller is further configured to (i) cause the optical path conversion system to perform additional power level measurements using the photodetectors for correcting the N measured power levels of the N channels to account for crosstalk arising among the channels, the additional power level measurements at any given one of the photodetectors being measured when different combinations of channels are being measured at remaining ones of the photodetectors and (ii) cause the optical path conversion system to further measure a power level received by each of the N photodetectors when no channels are routed to any of the photodetectors, the additional power level measurements including a measurement of a power level received by each of the photodetectors when a different block of M/N channels are sequentially routed to each one of the photodetectors to thereby obtain (N+1) additional power level measurements.

2. The optical device of claim 1 wherein the second plurality of optical outputs includes N optical outputs, N being an integer greater than or equal to 2, the controller being further configured to cause the optical path conversion system to simultaneously direct a first sequence of N wavelength components to one of the N optical outputs and, subsequent thereto, simultaneously direct a second sequence of N wavelength components to one of the N optical outputs.

3. The optical device of claim 1 wherein the optical path conversion system includes a programmable optical phase modulator.

4. The optical device of claim 3 wherein the programmable optical phase modulator has an axis normal to a plane in which it extends that is nonparallel to a direction along which the optical beams exit and enter the optical port array.

5. The optical device of claim 1 wherein the programmable optical phase modulator is a liquid crystal on silicon (LCoS) device.

6. The optical device of claim 1 wherein the controller is further configured to develop a crosstalk matrix having entries that each specify a contribution to crosstalk by one photodetector to another of the photodetectors.

7. The optical device of claim 6 wherein the crosstalk matrix is a (M/N+(N+1))×N matrix.

8. A method for monitoring optical channels of a WDM optical signal, comprising:
a. simultaneously directing each channel in a first sequence of N channels of the WDM optical signal to a different one of N photodetectors, where N is greater than or equal to 2 and the WDM optical signal includes M channels, where M>N;
b. simultaneously measuring a power level of each of the N channels in the first sequence using the N photodetectors to obtain N measured power levels;
c. repeating steps (a) and (b) for one or more additional sequences of N channels of the WDM optical signal until the power level of each of the M channels has been measured by one of the photodetectors; and
d. performing additional power level measurements using the photodetectors for correcting the N measured power levels of the N channels to account for crosstalk arising among the channels, the additional power level measurements at any given one of the photodetectors being measured when different combinations of channels are being measured at remaining ones of the photodetectors, the additional power level measurements including (i) measuring a power level received by each of the N photodetectors when no channels are routed to any of the photodetectors and (ii) measuring a power level received by each of the photodetectors when a different block of M/N channels are sequentially routed to each one of the photodetectors to thereby obtain (N+1) additional power level measurements.

9. The method of claim 8 further comprising developing a crosstalk matrix having entries that each specify a contribution to crosstalk by one photodetector to another of the photodetectors.

10. The method of claim 9 wherein the crosstalk matrix is a (M/N+(N+1))×N matrix.

11. An optical device, comprising:
an optical port array having at least first and second optical inputs for receiving optical beams and at least a first plurality of optical outputs associated with switching functionality and a second plurality of optical outputs associated with channel monitoring functionality;
a dispersion element receiving the optical beam from an optical input and spatially separating the optical beam into a plurality of wavelength components;
a focusing element for focusing the plurality of wavelength components;
an optical path conversion system for receiving the plurality of wavelength components and selectively directing each of the wavelength components to a prescribed one of the optical ports;
a plurality of photodetectors each associated with one of the optical outputs in the second plurality of optical outputs for receiving a wavelength component therefrom; and
a controller for causing the optical path conversion system to:

a. simultaneously direct each wavelength component in a first sequence of N channels of the WDM optical signal to a different one of N photodetectors, where N is greater than or equal to 2 and the WDM optical signal includes M wavelength components, where M>N;
b. simultaneously measure a power level of each of the N wavelength components in the first sequence using the N photodetectors to obtain N measured power levels;
c. repeat steps (a) and (b) for one or more additional sequences of N wavelength components of the WDM optical signal until the power level of each of the M wavelength components has been measured by one of the photodetectors;
d. perform additional power level measurements using the photodetectors for correcting the N measured power levels of the N channels to account for crosstalk arising among the channels, the additional power level measurements at any given one of the photodetectors being measured when different combinations of channels are being measured at remaining ones of the photodetectors, wherein the additional measurements include a measurement of a power level received by each of the photodetectors when a different block of M/N channels are sequentially routed to each one of the photodetectors to thereby obtain (N+1) additional power level measurements; and
e. measure a power level received by each of the N photodetectors when no channels are routed to any of the photodetectors.

12. The optical device of claim 11 wherein the controller is further configured to develop a crosstalk matrix having entries that each specify a contribution to crosstalk by one photodetector to another of the photodetectors.

13. The optical device of claim 12 wherein the crosstalk matrix is a (M/N+(N+1))×N matrix.

* * * * *